Patented Dec. 22, 1953

2,663,746

UNITED STATES PATENT OFFICE 2,663,746

DEHYDROGENATION OF A NAPHTHENIC HYDROCARBON CONTAINING A GEMINAL CARBON ATOM

Herman Pines and Vladimir N. Ipatieff, Chicago, Ill., assignors to Universal Oil Products Company, Chicago, Ill., a corporation of Delaware No Drawing. Application April 28, 1950, Serial No. 158,913

11 Claims. (Cl. 260—668)

This invention relates to the conversion of naphthenic hydrocarbons into aromatic hydrocarbons. More particularly, the process relates to the conversion of a naphthenic hydrocarbon containing a geminal carbon atom into an aromatic hydrocarbon containing one more substituted nuclear carbon atom than present in said naphthenic hydrocarbon.

By a naphthenic hydrocarbon containing a geminal carbon atom, we mean a cyclohexane hydrocarbon having at least one carbon atom in the ring with two substituent hydrocarbon groups attached thereto. Thus, a naphthenic hydrocarbon containing a geminal carbon atom comprises, for example, 1,1,3-trimethylcyclohexane and 1,1,2,3-tetramethylcyclohexane.

This invention is particularly applicable to the conversion of alkylcyclohexane hydrocarbons having at least one carbon atom in the ring with two alkyl groups attached thereto and more particularly to polymethylcyclohexanes of this structure. That is, such naphthenic hydrocarbons have a geminal carbon atom and also have at least one and not more than five nuclear carbon atoms combined with the hydrocarbon group substituents. The substituent groups usually comprise methyl groups but it is understood that the invention is also applicable to the treatment of gem cyclohexane hydrocarbons in which the substituent groups are other alkyl groups such as ethyl, propyl, butyl, etc., or cycloalkyl groups, such as cyclopentyl, cyclohexyl, etc., aryl such as phenyl, etc., or are mixtures of said substituent groups.

One embodiment of this invention relates to a process for producing an alkyl aromatic hydrocarbon which comprises dehydrogenating a naphthenic hydrocarbon having a geminal carbon atom and also having at least one and not more than five nuclear carbon atoms combined with hydrocarbon group substituents in the presence of an acidic material to produce an alkyl aromatic hydrocarbon having one more substituted nuclear carbon atom than present in said naphthenic hydrocarbon and recovering said alkyl aromatic hydrocarbon.

Another embodiment of this invention relates to a process for producing an alkyl aromatic hydrocarbon which comprises dehydrogenating a naphthenic hydrocarbon having a geminal carbon atom and also having at least one and not more than five nuclear carbon atoms combined with alkyl group substituents in the presence of an acidic material to produce an alkyl aromatic hydrocarbon having one more substituted nuclear carbon atom than present in said naphthenic hydrocarbon and recovering said alkyl aromatic hydrocarbon.

A further embodiment of this invention relates to a process for preparing 1,2,4-trimethylbenzene which comprises catalytically dehydrogenating 1,1,3-trimethylcyclohexane in the presence of an alkyl halide to produce 1,2,4-trimethylbenzene and recovering said 1,2,4-trimethylbenzene.

We have found that when an alkylcyclohexane containing a geminal carbon atom, such as 1,1,3-trimethylcyclohexane is passed over a dehydrogenation catalyst such as platinized alumina, dehydrogenation and also demethylation reactions occur to produce an aromatic hydrocarbon having one less alkyl group than present in the charged alkylcyclohexane containing the geminal carbon atom. Thus, 1,1,3-trimethylcyclohexane when contacted with platinized alumina at 330° C. yields substantial amounts of meta-xylene together with methane and hydrogen as indicated by the following equation:

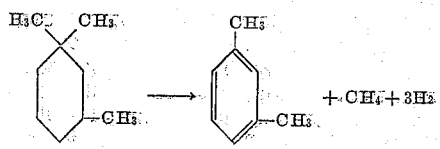

In the process of the present invention, we have found that demethylation can be avoided during such dehydrogenation by having present an acidic material or acid-producing compound which is added to the alkyl cyclohexane being charged to dehydrogenation. Such acid-producing compounds include particularly alkyl halides. For example, when 5% by weight of butylchloride is added to 1,1,3-trimethylcyclohexane and this solution is passed over platinized alumina containing 5% by weight of platinum at a temperature of 300° C. and an hourly liquid space velocity of 0.2, the product obtained consists of 1,2,4-trimethylbenzene and not of meta-xylene. Thus the aromatic product of the process, namely, 1,2,4-trimethylbenzene, has three substituted nuclear carbon atoms whereas the 1,1,3-trimethylcyclohexane has only two substituted carbon atoms as one of these substituted carbon atoms is a geminal carbon atom.

Similarly, whereas the dehydrogenation of 1,1,4,4-tetramethyltetrahydronaphthalene in the presence of platinized alumina yields 1,4-dimethylnaphthalene, similar dehydrogenation of this hydrocarbon starting material in the presence of platinized alumina and of hydrogen chloride results in the production of substantial yields of 1,2,3,4-tetramethylnaphthalene.

The catalysts preferred for this process comprise platinum or platinum supported on alumina or charcoal. With the platinum catalyst, the dehydrogenation temperature utilized is generally from about 275° to about 400° C. The addition of platinum to other dehydrogenation catalysts such as chromia-alumina and the like is generally beneficial in promoting isomerization during dehydrogenation.

Although the acid-producing material or acidic material employed in this process to promote isomerization during dehydrogenation may be added continuously or intermittently together with the hydrocarbon charging stock, a dehydrogenation catalyst may also be prepared in which a stable acid-acting compound is present therein as well as a material which promotes dehydrogenation. Thus, the presence of small amounts of silica-alumina mixed with a dehydrogenation catalyst will promote both dehydrogenation and isomerization. Also the addition of a small amount of hydrofluoric acid to alumina forms an acid-type catalyst suitable for promoting the dehydrogenation and isomerization reactions of this process.

Alkyl aromatic hydrocarbons formed by this process are useful as solvents, as intermediates in organic synthesis as in the production of dyes, medicinals, insecticides, etc. Some of the lower boiling polyalkylated aromatic hydrocarbons have high anti-knock qualities and are accordingly valuable components of gasolines.

The invention is further illustrated by the following examples but it is understood that the broad scope of the invention is not limited thereto.

Example I

Platinum-alumina catalyst, (H. Pines, R. C. Olberg and V. N. Ipatieff, J. Amer. Chem. Soc. 70, 533 (1948)) was prepared by heating platinum, 12.0 grams in a steam-bath with aqua regia, until solution was complete. The excess acid was removed by evaporating the solution almost to dryness and then adding a 100 cc. portion of water and again evaporating down; this procedure was repeated ten times. The chloroplatinic acid was dissolved in 200 cc. of distilled water and suction filtered to remove any contaminants. The clear filtrate was added to 150 cc. (120 grams) of 10–12 mesh alumina so that the liquid completely covered the alumina. The solution was evaporated on a steam-bath with thorough stirring. When dry the catalyst had a uniform yellow-orange color. It was heated in a vertical furnace at 100° C. in an atmosphere of hydrogen for several hours. The temperature was then raised to 200° C. and the heating continued for several more hours. Finally, it was heated at 254° C. for two hours prior to use for dehydrogenation. The reduced catalyst had a uniform gray color.

0.18 mole of 1,1,3-trimethylcyclohexane was passed over a previously used platinized alumina catalyst prepared as indicated above and containing 7% by weight of platinum maintained at a temperature of 300° C. The trimethylcyclohexane was passed over the catalyst at a rate corresponding to an hourly liquid space velocity of 0.2. During this treatment, 0.39 mole of gas formed which contained 32.2% methane and 67.8% of hydrogen. The recovered liquid products contained 37% by volume of unconverted 1,1,3-trimethylcyclohexane together with a mixture of aromatic hydrocarbons which was found to consist of 91% of meta-xylene and 9% of 1,2,4-trimethylbenzene.

Example II

In another run, similar to that described in Example I, 0.18 mole of 1,1,3-trimethylcyclohexane containing 5% by volume of secondary butyl chloride was passed over freshly regenerated platinized alumina catalyst containing 7% by weight of platinum at a catalyst temperature of 300° C. and using a hydrocarbon charging rate corresponding to an hourly liquid space velocity of 0.2. In this treatment, gas formation amounted to 0.30 mole and this gas contained 13% of methane and 83.6% of hydrogen. The recovered liquid products contained 49% by volume of unconverted 1,1,3-trimethylcyclohexane and a mixture of aromatic hydrocarbon containing 49% of meta-xylene and 47% of 1,2,4-trimethylbenzene.

Example III

Another run on a mixture of 1,1,3-trimethylcyclohexane and secondary butyl chloride following the procedure of Example II and employing the same catalyst produced 0.38 mole of gas containing 5% of methane and 95% of hydrogen. The recovered liquid products contained 38% by volume of unconverted 1,1,3-trimethylcyclohexane based upon that charged together with a mixture of aromatic hydrocarbons containing 23% of meta-xylene and 70% of 1,2,4-trimethylbenzene.

Example IV

The catalyst employed in Example III was heated in a stream of hydrogen at a temperature of 300° C. for a time of 70 minutes and then 0.19 mole of 1,1,3-trimethylcyclohexane was passed over this catalyst at a temperature of 300° C. and at an hourly liquid space velocity of 0.2. This treatment produced 0.34 mole of gas and liquid products containing 43% by volume of unconverted 1,1,3-trimethylcyclohexane together with a mixture of aromatic hydrocarbons consisting of 21% of meta-xylene and 79% of 1,2,4-trimethylbenzene. These results show that considerable isomerization accompanied the dehydrogenation in the presence of this catalyst which had been treated with hydrogen even though the 1,1,3-trimethylcyclohexane charged in this run did not contain an added acidic material or acid-producing material such as secondary butyl chloride.

Example V

The catalyst employed in Example IV was regenerated by heating in air and then 0.19 mole of 1,1,3-trimethylcyclohexane was passed over this catalyst at an hourly liquid space velocity of 0.2 and a catalyst temperature of 300° C. Gas formed in this treatment amounted to 0.4 mole. The recovered liquid products contained 21% by volume of unconverted 1,1,3-trimethylcyclohexane and a mixture of aromatic hydrocarbons containing 80% of metaxylene and 16% of 1,2,4-trimethylbenzene. These proportions of meta-xylene and 1,2,4-trimethylbenzene indicated that much less isomerization occurred during dehydrogenation in the presence of the freshly regenerated catalyst than that which was observed in the presence of the catalyst employed in Examples III and IV and which may have contained chloride derived from secondary butyl chloride in the run of Example III.

Example VI

The dehydrogenation reactor to be employed in this run was charged with 20 grams of platinum charcoal catalyst containing 5% by weight of platinum. Over this catalyst 0.16 mole of 1,1,3-trimethylcyclohexane was passed at an hourly liquid space velocity of 0.2 while the catalyst was maintained at a temperature of 300° C. Gases formed during this treatment amounted to 0.19 mole and consisted of 29% of methane and 71% of hydrogen. The recovered liquid products contained 70% by volume of unconverted 1,1,3-trimethylcyclohexane mixed with meta-xylene and no 1,2,4-trimethylbenzene.

In a similar run, in the presence of the same catalyst, a mixture of 1,1,3-trimethylcyclohexane containing 5% by weight of secondary butyl chloride at a temperature of 300° C. gave 0.8 mole of gas containing 18% of methane and 82% of hydrogen. The recovered liquid products contained 86% by volume of unconverted 1,1,3-trimethylcyclohexane together with a mixture of aromatic hydrocarbons consisting of 64% of meta-xylene and 36% of 1,2,4-trimethylbenzene.

We claim as our invention:

1. A process for producing an alkyl aromatic hydrocarbon from a cyclohexane hydrocarbon having no fused rings and having a geminal carbon atom and also having at least one but not more than five nuclear carbon atoms combined with hydrocarbon group substituents, said process comprising dehydrogenating said cyclohexane hydrocarbon in the presence of a platinum-containing dehydrogenation catalyst and an alkyl halide to produce an alkyl aromatic hydrocarbon having one more substituted nuclear carbon atom than present in said cyclohexane hydrocarbon, and recovering said alkyl aromatic hydrocarbon.

2. A process for producing an alkyl aromatic hydrocarbon from a cyclohexane hydrocarbon having no fused rings and having a geminal carbon atom and also having at least one but not more than five nuclear carbon atoms combined with alkyl group substituents, said process comprising dehydrogenating said cyclohexane hydrocarbon in the presence of a platinum-containing dehydrogenation catalyst and an alkyl halide to produce an alkyl aromatic hydrocarbon having one more substituted nuclear carbon atom than present in said cyclohexane hydrocarbon, and recovering said alkyl aromatic hydrocarbon.

3. A process for producing an alkyl aromatic hydrocarbon from a cyclohexane hydrocarbon having no fused rings and having a geminal carbon atom and also having at least one but not more than five nuclear carbon atoms combined with hydrocarbon group substituents, said process comprising dehydrogenating said cyclohexane hydrocarbon in the presence of a platinized alumina catalyst and an alkyl halide at a temperature of from about 250° to about 400° C. to produce an alkyl aromatic hydrocarbon having one more substituted nuclear carbon atom than present in said cyclohexane hydrocarbon, and recovering said alkyl aromatic hydrocarbon.

4. A process for producing an alkyl aromatic hydrocarbon from a cyclohexane hydrocarbon having no fused rings and having a geminal carbon atom and also having at least one but not more than five nuclear carbon atoms combined with hydrocarbon group substituents, said process comprising dehydrogenating said cyclohexane hydrocarbon in the presence of a platinized charcoal catalyst and an alkyl halide at a temperature of from about 250° to about 400° C. to produce an alkyl aromatic hydrocarbon having one more substituted nuclear carbon atom than present in said cyclohexane hydrocarbon, and recovering said alkyl aromatic hydrocarbon.

5. A process for preparing 1,2,4-trimethylbenzene which comprises catalytically dehydrogenating 1,1,3-trimethylcyclohexane in the presence of a platinum-containing catalyst and an alkyl halide to produce 1,2,4-trimethylbenzene and recovering said 1,2,4-trimethylbenzene.

6. A process for preparing 1,2,4-trimethylbenzene which comprises dehydrogenating 1,1,3-trimethylcyclohexane in the presence of a platinum catalyst and of an alkyl halide at a temperature of from about 250° C. to about 400° C. to produce 1,2,4-trimethylbenzene and recovering 1,2,4-trimethylbenzene.

7. A process for preparing 1,2,4-trimethylbenzene which comprises dehydrogenating 1,1,3-trimethylcyclohexane in the presence of a platinized alumina catalyst and of an alkyl halide at a temperature of from about 250° C. to about 400° C. to produce 1,2,4-trimethylbenzene and recovering 1,2,4-trimethylbenzene.

8. A process for preparing 1,2,4-trimethylbenzene which comprises dehydrogenating 1,1,3-trimethylcyclohexane in the presence of a platinum catalyst and of an alkyl chloride at a temperature of from about 250° C. to about 400° C. to produce 1,2,4-trimethylbenzene and recovering 1,2,4-trimethylbenzene.

9. A process for preparing 1,2,4-trimethylbenzene which comprises dehydrogenating 1,1,3-trimethylcyclohexane in the presence of a platinum catalyst and of a butyl chloride at a temperature of from about 250° C. to about 400° C. to produce 1,2,4-trimethylbenzene and recovering 1,2,4-trimethylbenzene.

10. A process for preparing 1,2,4-trimethylbenzene which comprises dehydrogenating 1,1,3-trimethylcyclohexane in the presence of a platinum-charcoal catalyst and of an alkyl chloride at a temperature of from about 250° C. to about 400° C. to produce 1,2,4-trimethylbenzene and recovering 1,2,4-trimethylbenzene.

11. A process for preparing 1,2,4-trimethylbenzene which comprises dehydrogenating 1,1,3-trimethylcyclohexane in the presence of a platinum-charcoal catalyst and of a butyl chloride at a temperature of from about 250° C. to about 400° C. to produce 1,2,4-trimethylbenzene and recovering 1,2,4-trimethylbenzene.

HERMAN PINES.
VLADIMIR N. IPATIEFF.

References Cited in the file of this patent

UNITED STATES PATENTS

| Number | Name | Date |
|---|---|---|
| 2,431,755 | Ipatieff et al. | Dec. 2, 1947 |
| 2,435,443 | Ipatieff et al. | Feb. 3, 1948 |

OTHER REFERENCES

Linstead et al., Jour. Chem. Soc. (1940), pages 1127–1134 (8 pages).

Egloff et al., "Isomerization of Pure Hydrocarbons," pages 302, 303, 471 (3 pages). Published by Reinhold Pub. Corp., New York (1942).